United States Patent
Kolena et al.

(12)

(10) Patent No.: US 6,322,148 B1
(45) Date of Patent: Nov. 27, 2001

(54) VEHICLE SEAT CONNECTION ASSEMBLY

(75) Inventors: David P. Kolena, Bloomfield Hills; Alan Dean Berg, Romeo; Danny Saenz, Shelby Township, all of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/561,233

(22) Filed: Apr. 28, 2000

(51) Int. Cl.$^7$ ....................................................... A47C 7/02
(52) U.S. Cl. .................................. 297/452.2; 297/354.12
(58) Field of Search ........................... 297/452.18, 425.2, 297/440.15, 440.16, 440.2, 440.21, 440.24, 361.1, 354.12

(56) References Cited

U.S. PATENT DOCUMENTS

| | | | |
|---|---|---|---|
| 4,881,776 | * | 11/1989 | Wang . |
| 5,169,211 | * | 12/1992 | Inaba et al. . |
| 5,564,786 | * | 10/1996 | Peek et al. . |
| 5,575,533 | * | 11/1996 | Glance . |
| 5,673,972 | | 10/1997 | Dudash et al. . |
| 5,711,577 | * | 1/1998 | Whalen . |
| 5,716,100 | * | 2/1998 | Lang . |
| 5,735,572 | | 4/1998 | Clark et al. . |
| 5,749,135 | * | 5/1998 | Crane et al. . |
| 5,909,926 | | 6/1999 | Gonzalez . |
| 5,941,602 | | 8/1999 | Sturt et al. . |
| 5,988,756 | * | 11/1999 | Aufrere et al. . |
| 5,988,757 | | 11/1999 | Vishey et al. . |

* cited by examiner

*Primary Examiner*—Milton Nelson, Jr.
(74) *Attorney, Agent, or Firm*—Brooks & Kushman P.C.

(57) ABSTRACT

The present disclosure involves a vehicle seat connection assembly having a seat back frame connecting to a seat bottom frame by a hinge member. The seat back frame has a leg which extends to an end portion wherein the end portion is hollow and has an aperture transversely formed therethrough. The end portion has an indented wall formed about the aperture and terminates at an opening. A securing member is disposed at the end portion through the aperture. The hinge member has a pivotal end attached to the seat bottom frame and a prong end having first and second spaced apart prongs which are disposed through the opening of the end portion. The prongs flank the securing member and engage the indented wall of the end portion of the seat back frame. The indented wall of the end portion is formed to complement the shape of the prongs to provide sufficient surface area support.

20 Claims, 2 Drawing Sheets

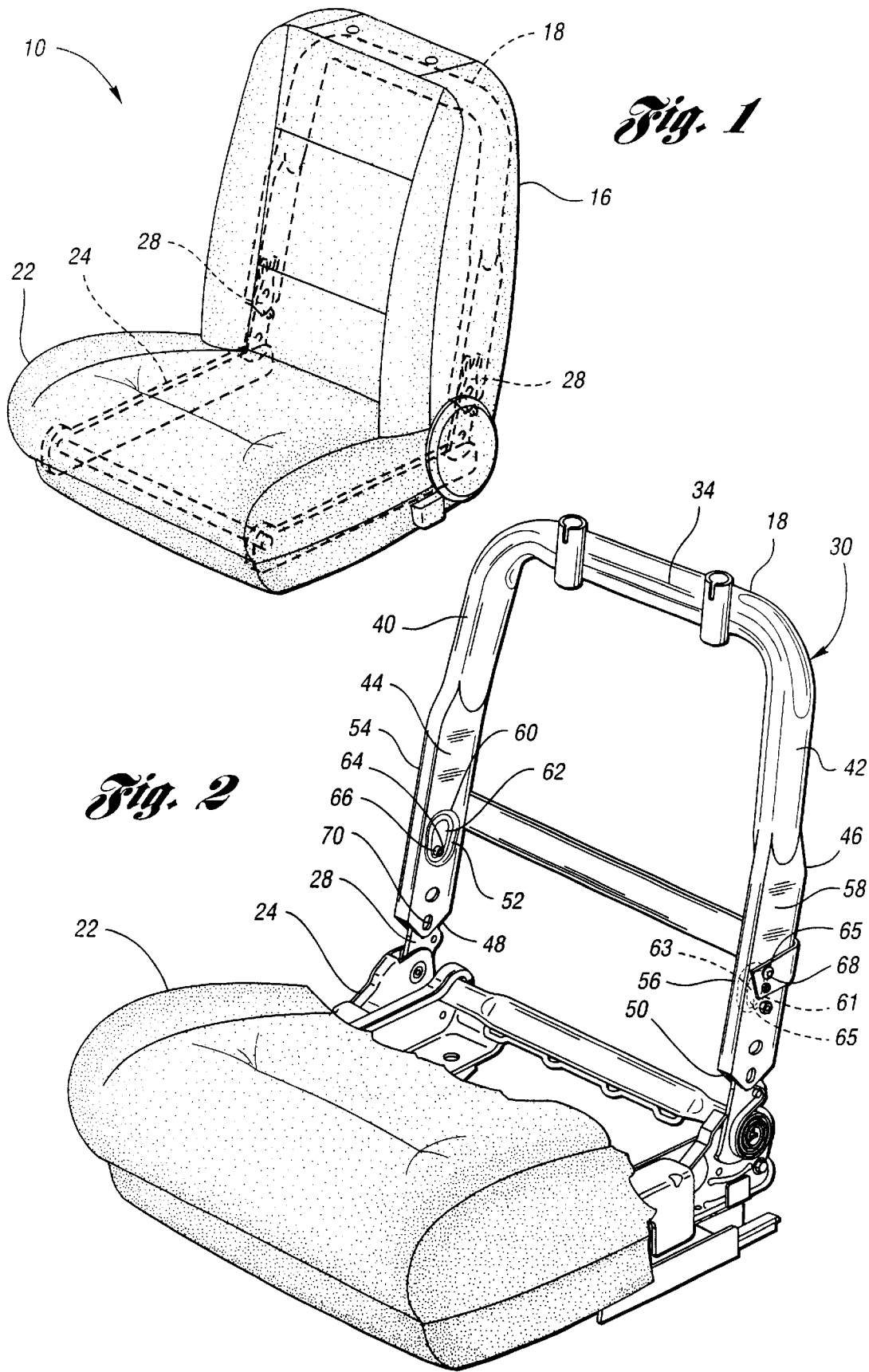

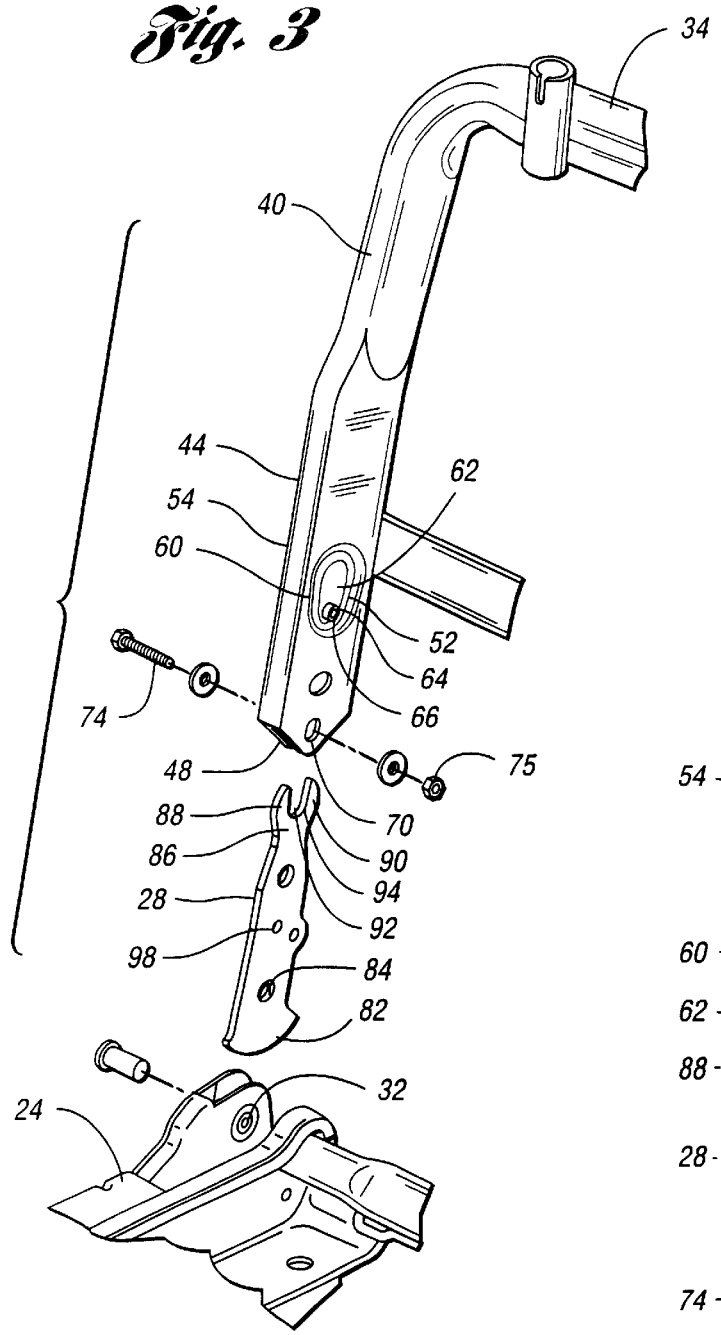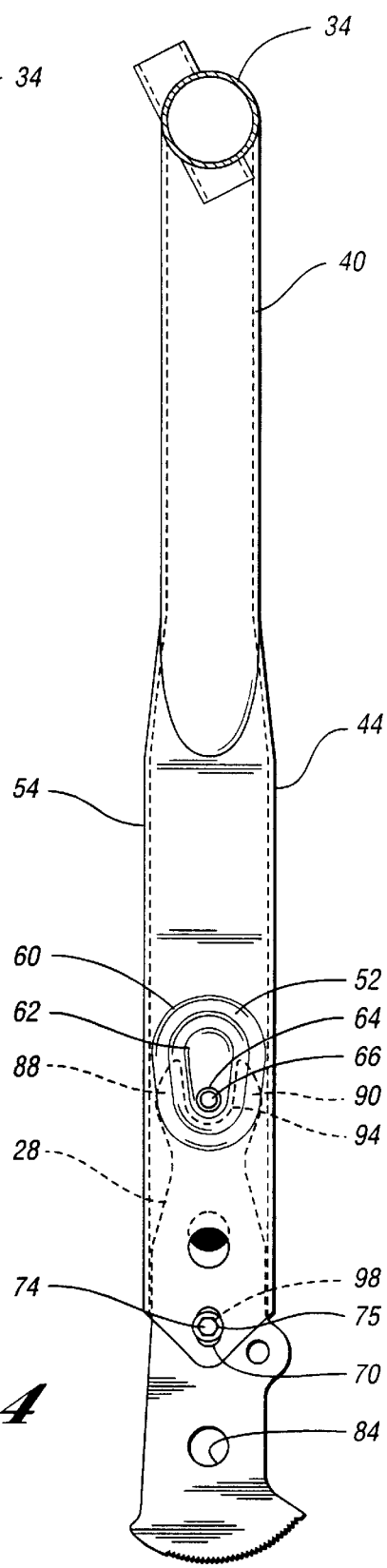

VEHICLE SEAT CONNECTION ASSEMBLY

TECHNICAL FIELD

The present invention relates to a vehicle seat connection assembly having a hinge member for pivotally connecting a seat back frame and a seat bottom frame of the vehicle seat.

BACKGROUND ART

A vehicle seat is a significant component in the manufacture of vehicles. Although many vehicle seats have industrial potential, there is a need to improve vehicle seat assemblies. Typically, a vehicle seat assembly includes a seat back frame pivotally connected to a seat bottom frame with relatively little surface area contact. In many situations, a large portion of the weight of the seat back frame is supported merely by the surface area of contact of connection between the seat back and seat bottom frames. Thus, a relatively large amount of stress is directed onto a relatively small surface area at which the seat back frame connects to the seat bottom.

Moreover, many seat assemblies have connecting components requiring a relatively close fit during assembly thereof. In many situations, if the seat is assembled imprecisely, then the weight placed thereon constantly shifts during vehicle travel, resulting in seat flutter. Furthermore, such seat assemblies have connecting components that are difficult to assemble during the manufacturing of the vehicle seat. For example, in many situations, it may take the manufacturing technician or technicians several times to connect the seat back frame to the seat bottom frame, due to the relatively close connection required. Moreover, the manufacturing technician is required to retract the seat back trim in order to properly secure the seat back to the seat bottom. This difficulty increases manufacturing time and, in turn, increases costs.

Thus, what is needed is a vehicle seat assembly having a relatively large surface area of contact at which the seat back frame connects to the seat bottom frame to provide sufficient surface area support.

What is also needed is a vehicle seat assembly having a fit which connects the seat back frame to the seat bottom frame and uniformly absorbs weight placed thereon.

What is also needed is a vehicle seat assembly having connecting components requiring less manufacturing time.

DISCLOSURE OF INVENTION

It is an object of the present invention to provide for an improved vehicle seat. The vehicle seat comprises a seat back frame and a seat bottom frame pivotally attached thereto by a hinge member. The seat back frame has a leg which extends to an end portion wherein the end portion is hollow and has an indented wall formed inwardly. The end portion terminates at an opening. The hinge member has a pivotal end attached to the seat bottom frame and a prong end having first and second spaced apart prongs disposed through the opening of the end portion. The prongs flank and engage the indented wall of the end portion of the seat back frame. The indented wall of the end portion is formed to complement the shape of the prongs to provide sufficient surface area support.

It is another object of the present invention to provide for an improved vehicle seat connection assembly for connecting a seat back frame to a seat bottom frame. The assembly includes a leg integral to the seat back frame extending to an end portion wherein the end portion is hollow and has an aperture transversely formed therethrough. The end portion has an indented wall formed about the aperture and terminates at an opening. The assembly further includes a securing member disposed at the end portion through the aperture. The assembly further includes a hinge member having a pivotal end pivotally attached to the seat bottom frame and a prong end engaging the end portion. The prong end has first and second spaced apart prongs disposed through the opening of the end portion wherein the prongs flank the securing member and engage the indented wall of the end portion of the seat back frame. The indented wall of the end portion is formed to complement the shape of the prongs to provide sufficient surface area support.

It is yet another object of the present invention to provide for an improved hinge member for pivotally connecting a seat back frame to a seat bottom frame to define a vehicle seat assembly. The hinge member comprises a pivotal end and a prong end. The pivotal end pivotally attaches to the seat bottom frame. The prong end engages the seat back frame. The prong end has first and second spaced apart prongs to define a void between the inner surface of the first and second prongs. The inner surface engages the seat back frame to fill the void.

BRIEF DESCRIPTION OF DRAWINGS

FIG. 1 is a perspective view of a vehicle seat having a vehicle seat connection assembly in accordance with the present invention;

FIG. 2 is a perspective view of the vehicle seat showing the connection assembly partially exposed;

FIG. 3 is an exploded perspective view of a portion of the vehicle seat connection assembly; and FIG. 4 is a partial side view of the vehicle seat connection assembly of FIG. 2.

BEST MODE FOR CARRYING OUT THE INVENTION

FIG. 1 illustrates vehicle seat 10 having seat back 16 connected to seat bottom 22 by hinge members 28. Seat back frame 18, shown in phantom, is covered by a conventional seat back trim to define seat back 16. Seat bottom frame 24, shown in phantom, is covered by a conventional seat bottom trim to define seat bottom 22.

FIG. 2 illustrates seat connection assembly 30 which comprises seat back frame 18, seat bottom frame 24, and hinge members 28 which connect seat back frame 18 to seat bottom frame 24. Seat back frame 18 includes lateral member 34 which arcuately extends to legs 40, 42. Legs 40, 42 further respectively extend to end portions 44, 46 which terminate at respective openings 48, 50. End portions 44, 46 are hollow and respectively have indented walls 52, 56 and opposing walls 54, 58.

FIGS. 2–4 illustrate leg 40, a portion of lateral member 34, and a portion of seat bottom frame 24. As shown in FIG. 3, indented wall 52 of end portion 44 is formed to be indented towards opposing wall 54 to define indentation 60. FIGS. 2–4 further illustrate end portion 44 of leg 40, wherein indentation 60 is formed. As shown, indentation 60 defines contact area 62 tapering towards opening 48. Thus, indentation 60 includes contact area 62 at which indented wall 52 and opposing wall 54 are preferably in contact. As shown, contact area 62 provides an area through which contact aperture 64 is transversely formed. Securing member or roll pin 66 may be disposed in contact aperture 64. Adjacent to opening 48, securing aperture 70 is formed through indented wall 52. It is to be noted that, as shown in FIG. 2, leg 42 includes components and formations similar as to components and formations of leg 40 above. Particularly, end portion 46, aperture 65, indented wall 56, opposing wall 58, indentation 61, opening 50, contact area 63, securing aperture 72, and securing member 68 are respectively similar to end portion 44, aperture 64, indented wall 52, opposing wall 54, indentation 60, opening 48, contact area 62, securing aperture 70, and securing member 66 of leg 40.

FIGS. 3 and 4 illustrate hinge member 28 having pivotal end 82 and prong end 86. Pivotal end 82 includes pivot hole 84 formed transversely thereon. Prong end 86 has two prongs formed thereon. As shown, prong end 86 is insertable through opening 48 to engage end portion 44. Prong end 86 has first and second prongs 88, 90 which flare outwardly to define void 92 between inner surface 94 of prongs 88, 90. Inner surface 94 is generally U-shaped and receives tapered contact area 62 which fits to substantially fill void 92. Moreover, first and second prongs 88, 90 are configured to fit around area 62 and flank securing member 66. Indentation 60 is formed to complement the shape of prong end 86 for increased surface area contact to provide sufficient surface area support. As shown, prongs 88, 90 also include outer surface 96 which engages walls 52, 54 forming indentation 60.

The hinge member 28 has a securing hole 98 which aligns with securing aperture 70 of indented wall 52 such that bolt 74 may be disposed therethrough and secured by nut 75 to provide further securement of seat back frame 18 to seat bottom frame. Additional apertures and holes may also be aligned with each other for further securement as desired.

As shown in FIGS. 3 and 4, pivotal end 82 of hinge member 28 pivotally attaches to seat bottom frame 24 in order to pivotally connect seat back frame 18 thereto. More specifically, pivotal end 82 pivotally attaches to seat bottom frame 24 by aligning pivot hole 84 with attaching hole 32 of frame 24, as shown in FIG. 2. A rivet or bolt extends through pivot hole 84 and attaching hole 32 to define a pivotal attaching point, thereby allowing conventional pivotal connection of seat back frame 18 to seat bottom frame 24. Serrations formed on pivotal end 82 engage with complementing serrations of a conventional pawl of seat bottom frame 24 to provide camming for conventional operation of a vehicle seat recliner mechanism of seat bottom frame 24. The seat back frame 18, seat bottom frame 24, and hinge member 28 may be formed from steel, aluminum, or any other suitable material or composite thereof.

To assemble vehicle seat connection assembly 30, pivotal attaching holes 32 align with holes 84 of hinge members 28 and are pivotally connected by bolts and nuts 74, 75. Once fastened to seat bottom frame 24, hinge members 28 are inserted through openings 48, 50 of seat back frame 18 and engage the respective contact areas 62, 63 as described above. Upon engagement with contact areas 62, 63, the first and second prongs fit around the contact areas to flank the respective securing member. Because securing members 66, 68 are respectively disposed in contact areas 62, 63 prior to attachment of a conventional seat back trim to seat back frame 18, a manufacturing technician need not retract the trim to insert the securing members therein.

Assembly 30 provides for less manufacturing time required for assembling the vehicle seat. The resulting less manufacturing time, in turn, reduces manufacturing costs. Moreover, the connection between the hinge members and the contact areas provide an improved fit which sufficiently distributes the weight placed thereon to lessen seat flutter. Thus, the weight of the seat back is substantially evenly distributed at areas of engagement between the hinge members and end portions. The seat connection assembly provides sufficient surface area support of the weight placed thereon.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat comprising:

a seat back frame having a leg extending to an end portion, the end portion being hollow, the end portion having an indented wall, the end portion terminating at an opening; and a seat bottom frame pivotally attached to the seat back frame by a hinge member, the hinge member having a pivotal end attached to the seat bottom frame and first and second spaced apart prongs disposed through the opening of the end portion, the prongs engaging the indented wall of the end portion of the seat back frame, the indented wall of the end portion being formed to complement the shape of the prongs to provide sufficient surface area support.

2. The vehicle seat of claim 1 wherein the end portion includes a second wall opposed to the indented wall, the indented wall contacting the second wall to define a tapered contact area through which an aperture is transversely formed, the tapered contact area tapering toward the opening of the end portion.

3. The vehicle seat of claim 2 wherein the prongs are flared outwardly to define a void between an inner surface of the prongs, the inner surface receiving the tapered contact area disposed in the void, the walls of the end portion engaging an outer surface of the prongs.

4. The vehicle seat of claim 2 further comprising a securing member disposed through the aperture, the prongs flanking the securing member.

5. The vehicle seat of claim 4 wherein the securing member is a roll pin.

6. The vehicle seat of claim 4 wherein the seat back frame includes a second leg extending to a second end portion, the second end portion being hollow and having an aperture transversely formed therethrough, the second end portion having an indented wall about the aperture, the second end portion terminating at an opening;

a second securing member disposed at the second end portion through the aperture; and the seat bottom frame pivotally attaches to the seat back frame by a second hinge member, the second hinge member having a pivotal end attached to the seat bottom frame and first and second spaced apart prongs disposed through the opening of the second end portion, the prongs flanking the second securing member and engaging the indented wall of the second end portions of the seat back frame, the indented wall of the second end portion being formed to complement the shape of the prongs to provide sufficient surface area support.

7. The vehicle seat of claim 1 wherein the seat bottom frame has a pivotal attaching point to which the hinge member attaches to provide pivotal movement of the seat back frame about the seat bottom frame.

8. The vehicle seat of claim 7 wherein the pivotal end of the hinge member includes a hole formed thereon through which the pivotal attaching point is disposed to pivotally attach the seat bottom frame to the seat back frame.

9. A vehicle seat connection assembly for connecting a seat back frame to a seat bottom frame, the assembly comprising:

a first leg operatively associated with the seat back frame extending to an end portion, the end portion being hollow and having an aperture transversely formed therethrough, the end portion having an indented wall formed about the aperture, the end portion terminating at an opening;

a securing member disposed at the end portion through the aperture; and a hinge member having a pivotal end adapted to be pivotally attached to the seat bottom frame and a prong end engaging the end portion, the prong end having first and second spaced apart prongs disposed through the opening of the end portion, the prongs flanking the securing member and adapted to engage the indented wall of the end portion of the seat back frame, the indented wall of the end portion being formed to complement the shape of the prongs to provide sufficient surface area support.

10. The assembly of claim 9 wherein the end portion includes an opposing wall to the indented wall, the indented wall formed inwardly contacting the opposing wall to define a tapered contact area through which the aperture is transversely formed, the tapered contact area tapering toward the opening of the end portion.

11. The assembly of claim 10 wherein the prongs are flared outwardly to define a void between an inner surface of the prongs, the inner surface receiving the tapered contact area disposed in the void, the opposing walls of the end portion engaging an outer surface of the prongs.

12. The assembly of claim 9 wherein the securing member is a roll pin.

13. The assembly of claim 9 wherein the seat bottom frame has a pivotal attaching point to which the hinge member attaches to provide pivotal movement of the seat back frame about the seat bottom frame.

14. The assembly of claim 13 wherein the pivotal end of the hinge member includes a hole formed thereon through which the pivotal attaching point is disposed to pivotally attach the seat bottom frame to the seat back frame.

15. The assembly of claim 9 wherein the seat back frame includes a second leg extending to a second end portion, the second end portion being hollow and having an aperture transversely formed therethrough, the second end portion having an indented wall about the aperture, the second end portion terminating at an opening;

a second securing member disposed at the second end portion through the aperture; and the seat bottom frame pivotally attaches to the seat back frame by a second hinge member, the second hinge member having a pivotal end attached to the seat bottom frame and first and second spaced apart prongs disposed through the opening of the second end portion, the prongs flanking the second securing member and engaging the indented wall of the second end portions of the seat back frame, the indented wall of the second end portion being formed to complement the shape of the prongs to provide sufficient surface area support.

16. A vehicle seat comprising:

a seat back frame having a leg extending to an end portion, the end portion being hollow, the end portion having an indented wall formed inwardly and a second wall opposed to the indented wall, the end portion terminating at an opening; and a seat bottom frame pivotally attached to the seat back frame by a hinge member, the hinge member having a pivotal end attached to the seat bottom frame and first and second spaced apart prongs disposed through the opening of the end portion, the prongs engaging the indented wall of the end portion of the seat back frame, the indented wall of the end portion being formed to complement the shape of the prongs to provide sufficient surface area support and contacting the second wall to define a tapered contact area through which an aperture is transversely formed, the tapered contact area tapering toward the opening of the end portion.

17. The vehicle seat of claim 16 wherein the prongs are flared outwardly to define a void between an inner surface of the prongs, the inner surface receiving the tapered contact area disposed in the void, the second wall of the end portion engaging an outer surface of the prongs.

18. The vehicle seat of claim 16 further comprising a securing member disposed through the aperture, the prongs flanking the securing member.

19. The vehicle seat of claim 16 wherein the seat bottom frame has a pivotal attaching point to which the hinge member attaches to provide pivotal movement of the seat back frame about the seat bottom frame.

20. The vehicle seat of claim 19 wherein the pivotal end of the hinge member includes a hole formed thereon through which the pivotal attaching point is disposed to pivotally attach the seat bottom frame to the seat back frame.

* * * * *